United States Patent
Thompson et al.

(10) Patent No.: US 12,429,495 B2
(45) Date of Patent: Sep. 30, 2025

(54) MEMS STRAIN SENSITIVITY CALIBRATION

(71) Applicant: InvenSense, Inc., San Jose, CA (US)

(72) Inventors: Matthew Julian Thompson, Beaverton, OR (US); Roberto Martini, Milan (IT)

(73) Assignee: InvenSense, Inc., San Jose, CA (US)

( * ) Notice: Subject to any disclaimer, the term of this patent is extended or adjusted under 35 U.S.C. 154(b) by 278 days.

(21) Appl. No.: 18/214,187

(22) Filed: Jun. 26, 2023

(65) Prior Publication Data
US 2024/0426867 A1    Dec. 26, 2024

(51) Int. Cl.
G01P 15/125    (2006.01)
G01P 21/00     (2006.01)
G01P 15/08     (2006.01)

(52) U.S. Cl.
CPC .......... G01P 15/125 (2013.01); G01P 21/00 (2013.01); *G01P 2015/0811* (2013.01)

(58) Field of Classification Search
CPC . G01P 15/125; G01P 21/00; G01P 2015/0811
See application file for complete search history.

(56) References Cited

U.S. PATENT DOCUMENTS

| | | | |
|---|---|---|---|
| 8,701,459 B2 * | 4/2014 | Geen | G01C 19/56 73/504.04 |
| 9,296,606 B2 | 3/2016 | Williams et al. | |
| 9,599,471 B2 | 3/2017 | Vohra et al. | |
| 9,952,252 B2 * | 4/2018 | Thompson | B81B 3/0086 |
| 10,088,315 B2 * | 10/2018 | Coronato | G01C 19/02 |
| 10,139,229 B2 * | 11/2018 | Coronato | G01C 19/5719 |
| 10,295,558 B2 * | 5/2019 | Thompson | B81B 7/008 |
| 10,794,702 B2 * | 10/2020 | Senkal | G01C 19/5726 |
| 11,009,350 B2 | 5/2021 | Thompson | |
| 11,268,976 B2 * | 3/2022 | Castro | B81B 3/0072 |
| 11,287,443 B2 * | 3/2022 | Dakshinamurthy | G01P 15/08 |
| 11,307,218 B2 * | 4/2022 | Hughes | G01P 21/00 |
| 11,662,361 B2 | 5/2023 | Fell et al. | |
| 2020/0064369 A1 * | 2/2020 | Thompson | G01P 15/125 |
| 2024/0425354 A1 * | 12/2024 | Martini | G01P 21/00 |

* cited by examiner

*Primary Examiner* — Freddie Kirkland, III

(74) *Attorney, Agent, or Firm* — Van Hoven PC; Joshua Van Hoven

(57) ABSTRACT

A MEMS sensor may include multiple sense electrodes located relative to respective portions of one or more proof masses of a MEMS layer of the sensor. Individual sense electrodes are capable of individual calibration within the drive and/or sense path for the sense electrode. A distance between each individual sense electrode relative to a proof mass is determined for the at-rest state of the sensor. Calibration values are determined based on these distances, and individual drive and/or sense signals associated with each sense electrode are modified to adjust for changes in distance, such as are caused by shifting, tilting, or bending of the MEMS layer or substrate.

23 Claims, 7 Drawing Sheets

MEMS STRAIN SENSITIVITY CALIBRATION

CROSS-REFERENCE TO RELATED APPLICATION

This application incorporates by reference the entirety of the U.S. patent application entitled "Deformation Mapping for Out-of-Plane Accelerometer Offset/Sensitivity Self-Calibration," filed concurrently herewith on the same day as the present application, which is incorporated by reference herein in its entirety.

BACKGROUND

Numerous items such as smart phones, smart watches, tablets, automobiles, aerial drones, appliances, aircraft, exercise aids, and game controllers may utilize sensors such as microelectromechanical system (MEMS) sensors during their operation. In many applications, various types of MEMS sensors such as accelerometers and gyroscopes may be used as motion sensors that in turn are used to monitor or control critical aspects of operation of a device.

One type of MEMS sensor is a capacitive MEMS sensor in which motion is sensed based on a change in capacitance due to movement of two charged surfaces with respect to each other. For example, a MEMS sensor has fixed electrodes at a first location and a movable proof mass which moves relative to the fixed electrodes in response to a force, such as a linear acceleration along an axis for a MEMS accelerometer or a Coriolis force caused by rotation about an axis for a MEMS gyroscope. The capacitive output sensed by the MEMS sensor is thus based not only on the movement of the proof mass relative to the sense electrode but also the initial position of the proof mass relative to the sense electrode when stationary. In complex MEMS sensors there may be complex geometries with multiple proof masses (or portions of proof masses) located relative to multiple sense electrodes. The initial stationary position of the proof mass (or portions thereof) relative to the sense electrodes may not be as initially designed (e.g., is not uniform), for example, based on manufacturing tolerances, packaging stresses during assembly with other component, and thermal stresses during operation in the field. The corresponding changes in capacitance values may result in errors in the MEMS sensor outputs.

SUMMARY

In an embodiment of the present disclosure, a MEMS device comprises a MEMS layer comprising a fixed portion and a movable portion, wherein the movable portion includes at least one proof mass. The MEMS device may further comprise a plurality of sense electrodes, wherein each sense electrode of the plurality of sense electrodes is located below a respective portion of the MEMS layer at a respective distance from the respective portion of the MEMS layer. The MEMS device may further comprise processing circuitry coupled to the MEMS layer and to each of the plurality of sense electrodes, wherein the processing circuitry is configured to provide a distinct drive signal to each electrode of the plurality of sense electrodes, and wherein each distinct drive signal is based on the respective sensitivity associated with the respective sense electrode.

In an embodiment of the present disclosure, a method for calibrating drive voltages of a MEMS accelerometer comprises providing, to each of a plurality of sense electrodes located below a MEMS layer, a distinct drive test signal, and receiving, from at least a portion of the MEMS layer, a combined signal based on the distinct drive test signals applied to the plurality of sense electrodes and a respective distance between each of the sense electrodes and a portion of the MEMS layer located above the sense electrode. The method may further comprise modifying, for a first sense electrode, a drive signal for the first sense electrode based on one or more portions of the combined signal corresponding to the first sense electrode and providing a distinct drive test signal to each of a plurality of sense electrodes located below a MEMS layer.

In an embodiment of the present disclosure, a method for providing drive signals to a MEMS accelerometer comprises providing, to each of a plurality of sense electrodes located below a MEMS layer, a distinct drive signal, wherein each drive signal is based on the gap between each sense electrode and the MEMS layer. The method may further comprise receiving, from at least a portion of the MEMS layer, a combined signal based on the distinct drive signals applied to the plurality of sense electrodes, determining an acceleration based on the combined signal.

In an embodiment of the present disclosure, a method for providing drive signals to a MEMS accelerometer comprises providing a common drive signal to a plurality of gain adjustors and adjusting, by one or more of the plurality of gain adjustors, the common drive signal to output a plurality of adjusted drive signals. The method further comprises receiving, by each of a plurality of sense electrodes connected to a respective one of the plurality of gain adjustors, one of adjusted drive signals, wherein the adjustment of each gain adjustor is based on a distance between each sense electrode of the plurality of sense electrodes and a MEMS layer located above the plurality of sense electrodes. The method further comprises receiving, from the MEMS layer, a combined signal based on the plurality of adjusted drive signals applied to the plurality of sense electrodes, and determining an acceleration based on the combined signal.

BRIEF DESCRIPTION OF DRAWINGS

The above and other features of the present disclosure, its nature, and various advantages will be more apparent upon consideration of the following detailed description, taken in conjunction with the accompanying drawings in which.

DETAILED DESCRIPTION

Figure 1:
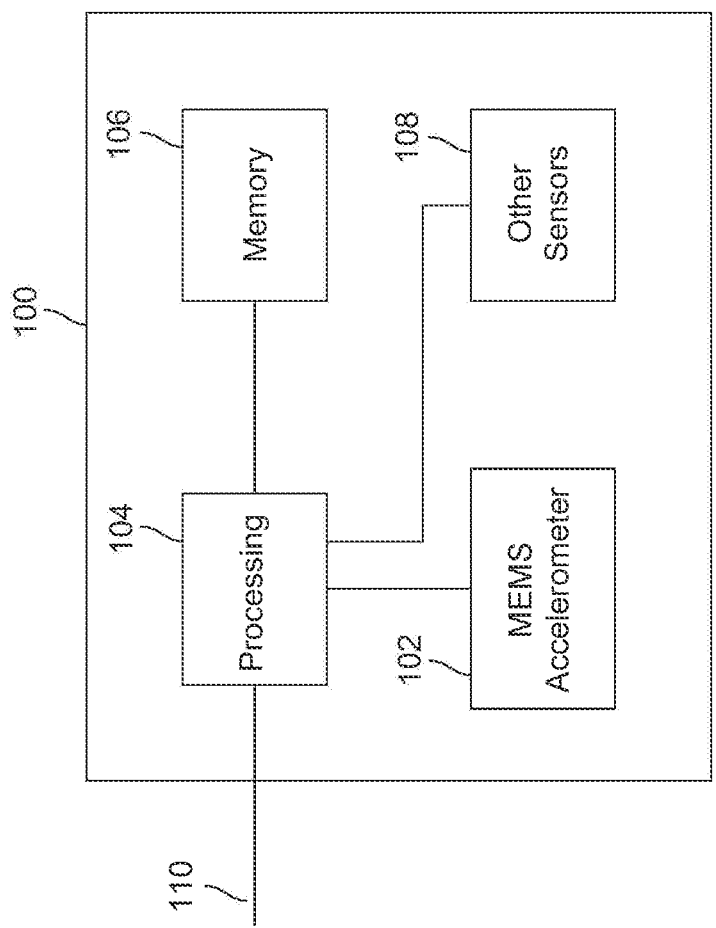
FIG. 1 shows an illustrative MEMS system in accordance with an embodiment of the present disclosure.

MEMS sensors typically include miniaturized micromechanical components patterned or otherwise fabricated within one or more semiconductor layers (e.g., a MEMS layer), and that are responsive to a force of interest, such as a linear acceleration, a Coriolis force generated based on angular velocity about an axis, or a pressure within a volume. The force causes a movement of a portion of the MEMS layer (e.g., a proof mass) in a direction according to the mechanical design of the micromechanical structure, such as the relationship of masses, springs, and anchors that collectively limit or facilitate movement in particular directions. The movement of the portion of the MEMS layer in response to the force is sensed, such as by a parallel plate located on an underlying layer (e.g., a substrate layer) or a parallel component (e.g., extending from a substrate to within the MEMS layer via an anchor or post) in the MEMS layer, depending on whether the motion in response to the force is out-of-plane or in-plane. In some implementations, this sensing is performed by one or more sense electrodes that form capacitors with the movable portions of the MEMS layer, such that the movement of the portions of the MEMS layer causes a change in capacitance of each individual capacitor formed between a respective sense electrode and movable portions of the MEMS layer. The capacitance or capacitances are sensed (e.g., by one or more capacitance-to-voltage converters) and used to quantify the force that caused the capacitance to change.

The MEMS sensor may include sense electrodes located at a variety of different locations relative to the movement of the movable portions of the MEMS layer. For example, in an example of an out-of-plane sensing accelerometer, the proof mass may move out-of-plane in response to acceleration about an axis within the MEMS plane, resulting in portions of the proof mass moving out-of-plane towards one or more sense electrodes and portions of the proof mass moving out-of-plane away from one or more additional sense electrodes. Providing multiple sense electrodes in this manner allows for differential sensing and additional accuracy in sensing. However, an assumption may be that in the absence of an out-of-plane movement caused by the force of interest, each of the sense electrodes is located at the same fixed distance from the proof mass, resulting in an identical capacitance at each of the sense electrodes while the proof mass is in its fixed or resting position. The distance between the proof mass at rest and each of the sense electrodes may not in fact be fixed or identical, due to often complex stresses or strains of the MEMS sensor packaging that may impart a variety of tilting, twisting, compressive, and/or bending forces on the MEMS layer, the underlying substrate layer, or both. As a result, the individual capacitors associated with each sense electrode and the proof mass may have different initial values while the proof mass is at rest, resulting in different absolute capacitance values and changes in capacitance resulting from the force of interest.

In an embodiment of the present disclosure, a calibration method is provided to account for this initial strain condition of the MEMS sensor. A distinct drive signal may be applied (e.g., via processing circuitry) to each electrode of the plurality of sense electrodes, and the output responses for each distinct drive signal may indicate the initial strain condition of the MEMS device. Based on the output responses, calibration values for each sense electrode may be determined and used to electrically "balance" the sense electrodes to eliminate the effect of the initial packaging strain, for example, by modifying respective drive signals that are provided to the sense electrodes so that the measured capacitance at each sense electrode in response to a force is the same, even if the actual distances between each electrode and the MEMS layer are not the same (e.g., due to the initial strain condition). As another example, rather than (or in addition to) changing the characteristics of the drive signals, post-processing may be applied to the output of each respective sense electrode prior to combining the signals for sensing, achieving the "balancing" of the capacitances via signal processing rather than (or in addition to) changing the capacitance with drive signals.

In some embodiments, one or more sense electrodes may also be situated under a fixed portion of the MEMS layer (e.g., under one or more fixed paddles within the MEMS layer). The fixed portion of the MEMS layer does not move in response to the force of interest, and generally does not have a change in its fixed position relative to underlying sense electrodes absent changes on the stresses and strains applied to the MEMS packaging, for example, due to an external stress applied to the packaging (e.g., via a device that the MEMS sensor is installed in) or significant changes in temperature. These sense electrodes can thus be used to measure the relative position of the fixed portion of the MEMS layer at different locations, which generally corresponds to the relative position of adjacent portions of the movable portions of the MEMS layer while at rest. Accordingly, the sense electrodes located below the fixed portions of the MEMS layer (e.g., in a direction perpendicular to the MEMS layer) may be used to estimate the relative locations of sense electrodes with respect to movable portions of the MEMS layer while at rest, both as part of the initial calibration routine or actively in the field.

FIG. 1 shows an illustrative MEMS system 100 in accordance with an embodiment of the present disclosure. Although particular components are depicted in FIG. 1, it will be understood that other suitable combinations of the MEMS, processing components, memory, and other circuitry may be utilized as necessary for different applications and systems. In an embodiment of the present disclosure, one or more sensors of the MEMS system include multiple sense electrodes located at different locations relative to portions of the proof mass. An initial position of each of the sense electrodes relative to the proof mass at rest is determined (e.g., by directly measuring capacitance of the respective sense electrodes) or estimated (e.g., based on adjacent sense electrodes located relative to fixed or movable portions of the MEMS layer). Based on these measurements and/or estimates, the manner in which measurements is performed to account for differences in initial position, such as by providing customized drive signals to each sense electrode located opposite a portion of the proof mass and/or modifying received C2V signals to compensate for differences in capacitance caused by differences in initial position.

Processing circuitry 104 may include one or more components providing processing based on the requirements of the MEMS system 100. In some embodiments, processing circuitry 104 may include hardware control logic that may be integrated within a chip of a sensor (e.g., on a base substrate of a MEMS accelerometer 102 or other sensors 108, or on an adjacent portion of a chip to the MEMS accelerometer 102 or other sensors 108) to control the operation of the MEMS accelerometer 102 or other sensors 108 and perform aspects of processing for the MEMS accelerometer 102 or the other sensors 108. In some embodiments, the MEMS accelerometer 102 and other sensors 108 may include one or more registers that allow aspects of the operation of hardware control logic to be modified (e.g., by modifying a value of a register). In some embodiments, processing circuitry 104 may also include a processor such as a microprocessor that executes software instructions, e.g., that are stored in memory 106. The microprocessor may control the operation of the MEMS accelerometer 102 by interacting with the hardware control logic and processing signals received from MEMS accelerometer 102. The microprocessor may interact with other sensors 108 in a similar manner. In some embodiments, some or all of the functions of the processing circuitry 104, and in some embodiments, of memory 106, may be implemented on an application specific integrated circuit ("ASIC") and/or a field programmable gate array ("FPGA").

Although in some embodiments (not depicted in FIG. 1), the MEMS accelerometer 102 or other sensors 108 may communicate directly with external circuitry (e.g., via a serial bus or direct connection to sensor outputs and control inputs), in an embodiment the processing circuitry 104 may process data received from the MEMS sensor 102 and other sensors 108 and communicate with external components via a communication interface 110 (e.g., a serial peripheral interface (SPI) or I2C bus, in automotive applications a controller area network (CAN) or Local Interconnect Network (LIN) bus, or in other applications a suitably wired or wireless communications interface as is known in the art). The processing circuitry 104 may convert signals received from the MEMS accelerometer 102 and other sensors 108 into appropriate measurement units (e.g., based on settings provided by other computing units communicating over the communication interface 110) and perform more complex processing to determine measurements such as orientation or Euler angles, and in some embodiments, to determine from sensor data whether a particular activity (e.g., walking, running, braking, skidding, rolling, etc.) is taking place. In some embodiments, some or all of the conversions or calculations may take place on the hardware control logic or other on-chip processing of the MEMS accelerometer 102 or other sensors 108.

In some embodiments, certain types of information may be determined based on data from multiple MEMS accelerometers 102 and other sensors 108 in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimensional cameras, industrial automation, and numerous other applications.

Figure 2:
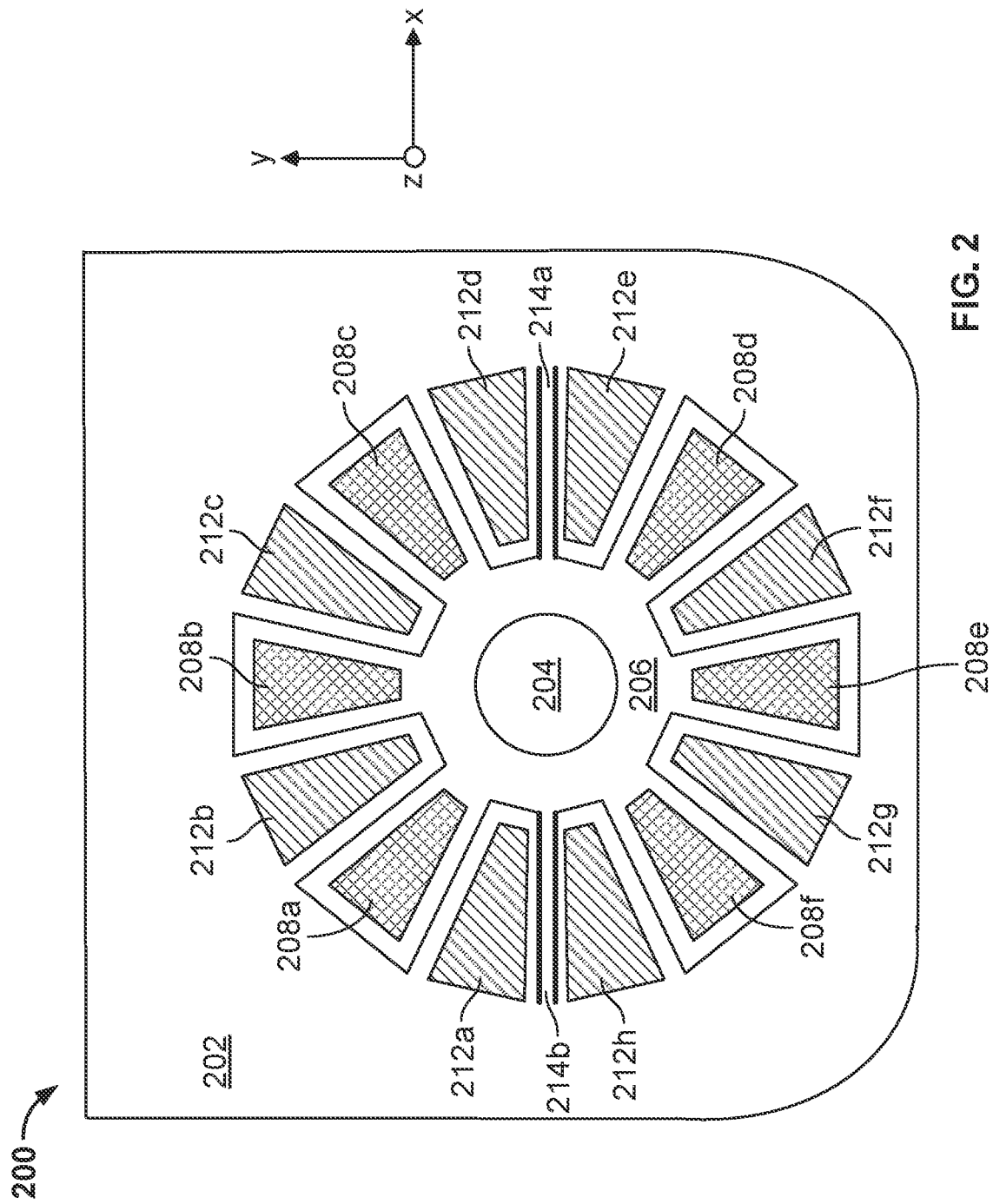
FIG. 2 shows an illustrative MEMS accelerometer including multiple independent sense electrodes, in accordance with an embodiment of the present disclosure.

FIG. 2 shows an illustrative MEMS accelerometer 200 including multiple independent sense electrodes, in accordance with an embodiment of the present disclosure. MEMS sensor 200 may be, for example, an accelerometer, although the present disclosure applies to any MEMS sensor (e.g., gyroscopes, pressure sensors, microphones, barometers, etc.) in which distances between a proof mass and a fixed sensing component (e.g., sense electrode) may be determined and/or estimated and processing modified via individual drive signals (e.g., providing drive signals to individual sense electrodes) and/or sense path (e.g., individually processing outputs of C2Vs associated with individual sense electrodes). The view depicted in FIG. 2 is a simplified top view of a MEMS layer of MEMS accelerometer 200, with numerous details and components excluded for ease of illustration. In some embodiments, the MEMS sensor 200 may include a MEMS layer that includes a movable portion 202 (e.g., a movable "proof mass" portion 202) and a fixed portion 206 (e.g., a fixed "paddle" portion 206). Cross hatching depicted in FIG. 2 corresponds to sense electrodes (e.g., paddle sense electrodes 208a-208f and proof mass sense electrodes 212a-212h) located on an upper surface of a substrate below the MEMS layer (e.g., including a movable proof mass portion 202 and a fixed paddle portion 206). Although particular features and elements are depicted in certain configurations for FIG. 2, features and elements may be removed, modified, or substituted and additional features or elements may be added in certain embodiments.

An anchor 204 is fixed to a substrate and/or cap of the MEMS accelerometer, such that the position of the anchor is fixed relative to the substrate and portions of the MEMS layer fixedly attached to the anchor (e.g., fixed paddle portion 206) are similarly fixed with respect to the substrate. Although the fixed paddle portion 206 may have a fixed position relative to an underlying substrate, that position may not be uniform (e.g., the fixed paddle portion 206 may not be perfectly parallel to the underlying substrate) based on factors such as packaging stresses and strains that may cause even fixed portions of the MEMS layer and/or substrate to shift, tilt, bend, or otherwise deform with respect to each other.

The MEMS layer of the MEMS sensor 200 includes a movable proof mass portion 202 that is coupled to the fixed paddle portion 206 via torsion springs 214a and 214b. Movable proof mass portion 202 is unbalanced in the depicted embodiment, such that a linear acceleration along the z-axis in either direction cause a corresponding rotation of the movable proof mass portion 202 out of the plane defined by the MEMS layer at rest about torsion springs 214a and 214b, resulting in a portion of the movable proof mass portion 202 moving in the positive z-direction away from the substrate (and certain electrodes on the substrate) and a portion of the movable proof mass portion 202 moving in the negative z-direction towards the substrate (and certain other electrodes on the substrate).

While at rest, the movable proof mass portion 202 of the MEMS layer is located at an initial position within the plane defined by the MEMS layer as a whole, but at a location based on the same stresses and strains that are imparted on the fixed paddle portion of the MEMS layer. In this manner, the initial position of the movable proof mass portion 202 relative to the substrate (and any electrodes on the substrate) may not be uniform based on tilting, shifting, bending, or other impacts on the movable proof mass portion 202 or the underlying substrate.

A plurality of sense electrodes may be located below the MEMS layer (e.g., below the fixed paddle portion 206 and movable proof mass portion 202), and each sense electrode may form a capacitance that varies based on the distance between the overlying portion of the MEMS layer and the electrode. It will be understood that when an acceleration is detected, for example, the proof mass 202 of the MEMS layer may rotate about an axis of rotation (e.g., based on the orientation of torsion springs 214a and 214b) that is out of plane relative to the plurality of sense electrodes, and the increase and decrease in capacitance may be processed by processing circuitry of the MEMS sensor 200 (e.g., via C2V circuitry, various filters, amplifiers, gain-offset-scaling circuitry, analog-to-digital converters, etc.) to determine acceleration. A first subset of the sense electrodes is located on the substrate below the fixed paddle portion 206, and are labeled as paddle sense electrodes 208a, 208b, 208c, 208d, 208e, and 208f. Although six paddle sense electrodes 208a-208f are depicted in FIG. 2, it will be understood that more or fewer paddle sense electrodes may be utilized in other suitable embodiments.

In some embodiments, each of the paddle sense electrodes 208a-208f may be provided a distinct drive signal (e.g., via processing circuitry 104). The processing circuitry may be configured to determine the respective distance between each paddle sense electrode 208a-208f and an associated portion of the fixed paddle portion 206 located above each electrode in the MEMS layer, based on receiving the distinct drive signals and being able to distinguish those drive signals and their corresponding capacitive sensing outputs. As is depicted in FIG. 2, the paddle sense electrodes 208a-208f are located adjacent to respective proof mass sense electrodes 212a-212h. In this manner distances associated with particular paddle sense electrodes may be used to estimate and/or further calibrate distances associated with proof mass sense electrodes, including during operation of the MEMS sensor in the field. For example, distances determined for paddle sense electrode 208a and paddle sense electrode 208b can be used to estimate a distance associated with proof mass sense electrode 212b, which is interdigitated between these two paddle sense electrodes. This estimation can occur even while the proof mass sense electrode is actively measuring acceleration, since the fixed paddle portion 206 of the MEMS layer does not move in response to acceleration.

In some embodiments, the movable proof mass portion 202 may include at least one proof mass, and a second subset of the plurality of sense electrodes may be located below the at least one proof mass on the substrate. As shown, for example, the second subset may include proof mass electrodes 212a, 212b, 212c, 212d, 212e, 212f, 212g, and 212h, although it will be understood that more or fewer proof mass electrodes may be utilized in other suitable embodiments, and in a variety of configurations. In some embodiments, the first subset of the plurality of sense electrodes and the second subset of the plurality of sense electrodes may be interdigitated. Similar to the paddle sense electrodes 208a-208f, in some embodiments each of the proof mass electrodes 212a-212h may be provided a distinct drive signal (e.g., via processing circuitry 104), in order to determine a distance between each respective proof mass sense electrode 212a-212h and an associated portion of the movable proof mass 202. In some embodiments, the distances associated with each proof mass sense electrode 212a-212h may be determined solely from these signals, without input from the paddle sense electrodes 208a-208f. This may allow paddle sense electrodes 208a-208f to be omitted from the MEMS sensor 200 altogether or simplified such as by omitting individual drive and/or sense circuitry. In some embodiments, only some of the proof mass sense electrodes may be used to determine distances, with other proof mass sense electrodes estimated based on the specifically determined distances.

Once a distance or value representative of distance for each (or a subset, as appropriate) of the proof mass sense electrodes, the processing circuitry may calibrate each sense electrode and provide appropriate processing based on this calibration. In some embodiments, the processing circuitry may include drive circuitry that can be modified to provide unique drive signals to each proof mass electrode 212a-212h, with the unique drive signal for each electrode selected in a manner such that the capacitive response to a particular acceleration will be the same for each electrode, or in some embodiments, may be balanced in another manner (e.g., with differentially located electrodes having identical capacitive responses). In some embodiments, the processing circuitry applies the distinct drive signals based on at least a voltage divider, a capacitor divider, a time multiplexer, a dual charge pump, an AC coupled divider, other suitable circuitry elements, or a combination thereof.

In some embodiments, the processing circuitry may function within the receive path associated with each respective proof mass sense electrode 212a-212h to modify the capacitive response associated with each proof mass sense electrode 212a-212h, for example, by scaling the output of the respective C2V circuitry associated with each proof mass sense electrode based on the distance and initial capacitive response associated with each proof mass sense electrode 212a-212h. In some embodiments, the processing circuitry may modify signals in both the drive signal path and sense path associated with each sense electrode, for example, to perform rough calibration via the drive signal input and fine calibration via modification of received signals in the sense path.

Although the present disclosure describes both determining a distance between respective sense electrodes and portions of a MEMS layer, and then utilizing calibration values during operation of the MEMS sensor, it will be understood that any of these functions may be performed individually. For example, distances and associated calibration values for individual sense electrodes could be determined by inspection or some other indirect method during manufacturing, assembly, testing, or sensor operation. The resulting calibration values could then be used to properly balance the sensed capacitances as described herein, for example, by adjusting drive signals and/or individually adjusting sensed signals within the processing circuitry sense path.

Figure 3:
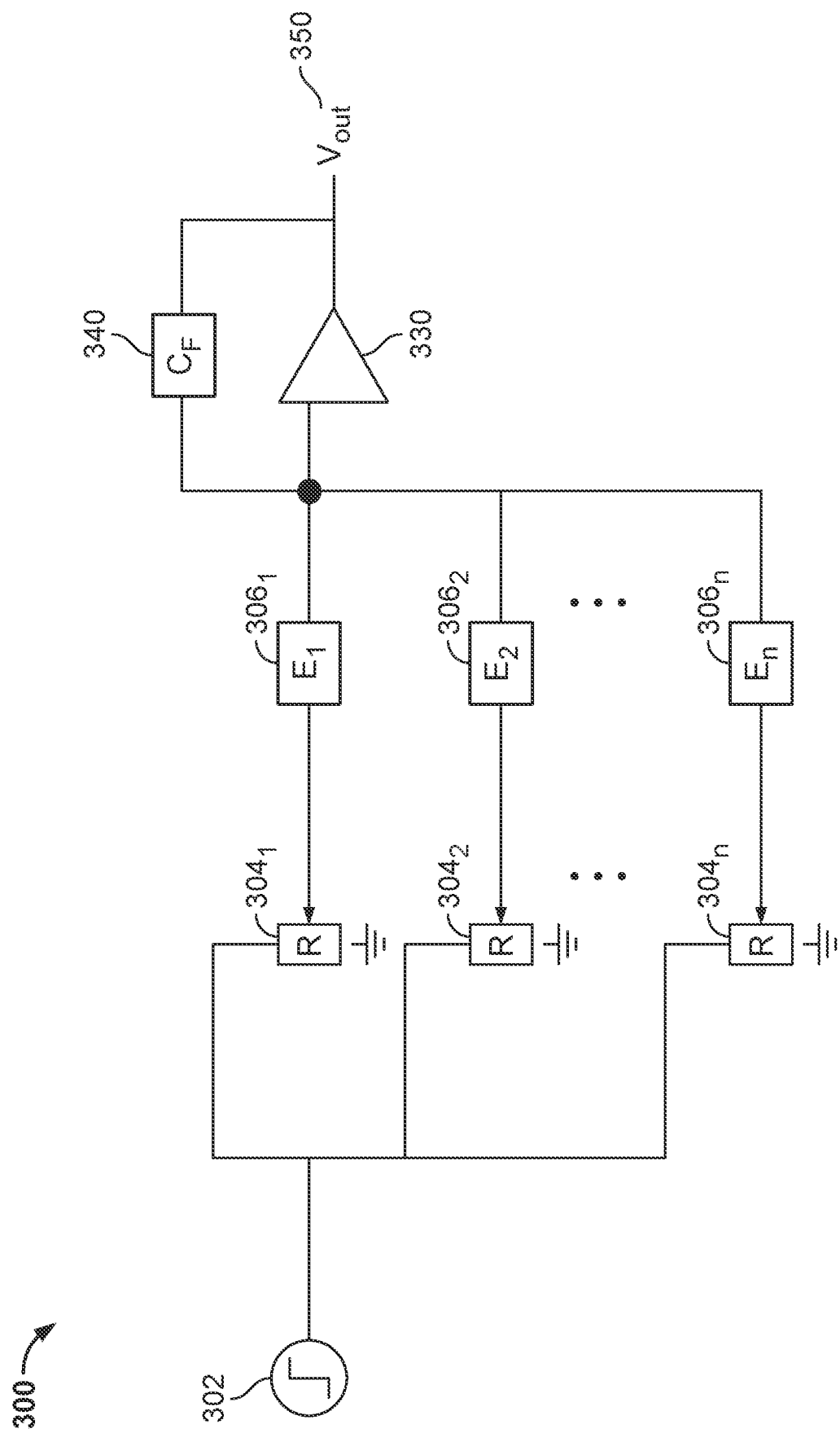
FIG. 3 shows an illustrative circuit diagram of components that provide distinct drive signals to individual sense electrodes of multiple sense electrodes, in accordance with an embodiment of the present disclosure.

FIG. 3 shows an illustrative circuit diagram 300 of components that provide distinct drive signals to individual sense electrodes $306_1$, $306_2$, ..., $306_n$, in accordance with some embodiments of the present disclosure. Although particular components and configurations are depicted in certain configurations for FIG. 3, elements and configurations may be removed, modified, or substituted and additional elements and configuration may be added in certain embodiments. Although "n" sense electrodes $306_1$ through $306_n$ are depicted in FIG. 3, it will be understood that any subset of these electrodes may be paddle sense electrodes (e.g., corresponding to 208a-208f) and/or proof mass sense electrodes (e.g., corresponding to 212a-212h).

Circuit diagram 300 includes drive input 302 as an input, which provides a drive voltage for each of the sense electrode $306_1$-$306_n$, that is individually modified before delivery to each of the sense electrodes $306_1$-$306_n$ by drive signal modification circuitry $304_1$-$304_n$. In an exemplary embodiment, drive input 302 provides an AC drive signal having a particular waveform (e.g., square wave, sinusoidal, or any other suitable AC waveform) and peak-to-peak voltage, although other drive signal types (e.g., a current source, DC source, modulated signals, encoded signals, etc.) may be provided as appropriate. In the embodiment depicted and described in FIG. 3, a drive signal is provided to each of the sense electrodes $306_1$-$306_n$ via modification circuitry $304_1$-$304_n$, which in FIG. 3 corresponds to variable resistors functioning as controllable voltage dividers $304_1$-$304_n$. In this manner, the peak-to-peak voltage of the drive signal provided to each of the sense electrodes $306_1$-$306_n$ is modified based on the state of the corresponding voltage divider $304_1$-$304_n$, which in turn is modified to test capacitances and/or provide calibrated individual drive signals for sense electrodes, as described herein.

Although a one-to-one association between voltage dividers $304_1$-$304_n$ and sense electrodes $306_1$-$306_n$ is depicted in FIG. 3, it will be understood that other associations may be provided depending on particular configurations, geometry, sensitivity requirements, or the like. For example, in an application where sensitivity requirements are relatively lower, or where particular subsets of sense electrodes are spaced close together or at geometries (e.g., as differential electrodes on opposite sides of an axis of rotation or other sets or pairs of electrodes with similar physical configurations) where they are likely to experience similar changes in initial capacitance, multiple sense electrodes may be driven from a single voltage divider (or other modification circuitry). As another non-limiting example, all sense electrodes associated with a paddle may be driven by a single modified drive signal or may be directly driven from the drive input 302.

Other methodologies of providing individual drive signals to sense electrodes $306_1$-$306_n$ may also be provided as substitutes, in combination with a voltage divider, or in combination with each other. For example, other possibilities for signal modification circuitry $304_1$-$304_n$ is include capacitive dividers (e.g., utilizing a capacitor divider), a dual charge pump (e.g., including a negative charge pump to counter the positive charge pump), time multiplexing (e.g., providing different signals to sense electrodes at different times), or a gain adjustor. In some embodiments, shared components may be switched into drive signal paths between the drive input 302 and sense electrodes $306_1$-$306_n$ to selectively applied modified drive signals to sense electrodes.

In the embodiment depicted in FIG. 3, connected to drive input 302 are a plurality of voltage dividers $304_1$-$304_n$, each located within an individual signal path to a corresponding sense electrode $306_1$-$306_n$. Each voltage divider of the plurality of voltage dividers $304_1$-$304_n$, may be coupled to a respective sense electrode of sense electrodes $306_1$-$306_n$. The output signals from each voltage divider $304_1$-$304_n$ are controllable (e.g., by processing circuitry modifying the voltage dividers to provide individualized test signals or calibrated drive signals) and are provided to each of the electrodes $306_1$-$306_n$ as a distinct drive test signal. It will be understood that n may represent a total number of sense electrodes of the plurality of sense electrodes on the MEMS sensor. For example, MEMS sensor 200 in FIG. 2 has 8 proof mass sense electrodes 212a-212h and 6 paddle sense electrodes 208a-208f, for a total of 14 sense electrodes (i.e., n=14 in MEMS sensor 200), where proof mass electrodes 212a-212h may correspond to $306_1$-$306_8$, and paddle sense electrodes 208a-208f may correspond to $306_9$-$306_{14}$.

Because the capacitance of each of the sense electrodes at calibration may be varied, in some embodiments, each resistor in the plurality of resistors may be a variable resistor. The resistance of the resistor may accordingly be changed in order to control the amount of voltage (i.e., the strength of the drive signal) being provided to the respective sense electrode. For example, if an initial strain causes a larger gap between electrode 212a and the MEMS layer compared to the gap between electrode 212e and the MEMS layer, an offset in the detected acceleration may exist even in the absence of any movement of the proof mass. Therefore, the calibration process may measure these gaps via testing of capacitances, and then vary the resistances of the resistors to drive a higher voltage to electrode 212a than to electrode 212e.

A calibration testing procedure may be provided in a variety of manners to distinguish the measured capacitances of individual sense electrodes, such as by varying the drive signal, signal modifications (e.g., by voltage dividers), and/or only measuring at certain points. In a simple test procedure, the voltage divider values may be set and modified such that a drive signal is provided to a single sense electrodes while the MEMS sensor is at rest, such that an initial capacitance associated with each sense electrode $306_1$-$306_n$ in response to the same drive signal is measured. In some embodiments where such testing is performed in the field, proof mass sense electrodes may be monitored during the test cycle to confirm that the accelerometer is not experiencing an acceleration. In other embodiments, particular subsets of electrodes may receive test signals (collectively or individually), such as providing distinct test signals to each paddle sense electrode while a MEMS sensor is the field to estimate changes that might be applicable to proof mass sense electrodes.

Once the calibration testing is performed, the drive signal 302 may be modified (e.g., by modifying the voltage dividers $304_1$-$304_n$) such that the capacitance associated with each sense electrode is matched (or has another predetermined relationship, e.g., for paddle sense electrodes vs. proof mass sense electrodes), according to:

$$V_{Ei}(\delta C) = V_d\left(1 + 2\frac{C_{Ei} - C_0}{C_0}\right) \quad (1)$$

where:
   $V_{Ei}$=voltage delivered to sense electrode "i"
   $\delta C$=difference in capacitance relative to base capacitance $C_0$
   $V_d$=peak-to-peak drive voltage
   $C_{Ei}$=capacitance of sense electrode "i"
   $C_0$=base capacitance In an exemplary embodiment where paddle sense electrodes are used to perform testing, $C_0$ equals the total capacitance of all paddle sense electrodes (e.g., corresponding to $208_a$-$208_f$) divided by the total number of paddle sense electrodes (e.g., six for $208_a$-$208_f$). The capacitance of each paddle sense electrode is then individually measured (e.g., by applying an individual drive signal to each paddle sense electrode individually and measuring the resulting capacitance) and then calculating a delta ($dC_i$) between the measured capacitance ($C_i$) and the base capacitance ($C_0$), according to:

$$dC_i = C_0 - C_i \quad (2)$$

The resulting delta values (e.g, $dC_a$–$dC_f$ for paddle sense electrodes $208_a$-$208_f$) can then be used to map a full second-order system for the particular MEMS sensor geometry, according to x-y position of the proof mass sense electrodes:

$$\text{gap}(x, y) = k_0 + k_x x + k_y y + k_{xx} x^2 + k_{yy} y^2 + k_{yy} y^2 + k_{xy} xy \quad (3)$$

Based on the estimated gaps for each proof mass sense electrode, the corresponding modified drive voltages provided to each proof mass sense electrode can be determined according to (1), based on the known relationship between different gap distances and relative capacitances.

Once the calibration testing is complete and the individual drive signals to be provided to each sense electrode are determined, measurement of force being sensed by the MEMS sensor (e.g., acceleration) may be performed based on the combined capacitive output $V_{out}$. The distinct drive test signals are provided to each of the sense electrodes $306_1$-$306_n$ such that at least the proof mass sense electrodes have a similar initial capacitance in the absence of an external force. When an external force is applied to the MEMS sensor that causes the capacitances of the proof mass sense electrodes to change, those capacitances are changing in an appropriate proportion relative to each other based on having the same initial capacitance. The collective capacitance sensed by the sensing circuitry (e.g., C2V 330 and C2V feedback 340) is effectively added to provide a combined output signal $V_{out}$ 350, according to:

$$V_{out} = \sum_{i=1}^{n} \left(\frac{c_i}{c_f} V_i\right) \quad (4)$$

$$V_{out} = \frac{V_d}{C_f} \sum_{i=1}^{n} \left(C_{0,Ei} + \frac{dC_{Ei}}{dz}\frac{dz}{dgee}\right) R_i \quad (5)$$

$$V_{out} = \frac{V_d}{C_f} \sum_{i=1}^{n} \frac{\epsilon_0 A}{g_i} R_i \left(1 - \frac{1}{g_i}\frac{dz}{dgee}\right) \quad (6)$$

where:
$V_{out}$=combined output voltage of proof mass sense electrodes
$V_d$=peak-to-peak drive voltage
$C_i$=sensed capacitance for each sense electrode "$i$"]
$C_f$=feedback capacitance
$C_{Ei}$=capacitance of each sense electrode "i"
$\epsilon_0$=dielectric constant
A=electrode area
dz=change in z-axis position of proof mass
dgee=change in linear acceleration
$R_i$=signal modification by voltage divider, where $R_i$ is between 0-1

In this manner, it will be understood that combined signal 350 may be based on the distinct drive signals and on the respective distances between each of the sense electrodes and the MEMS layer above the sense electrodes. The combined signal 350 may include one or more portions that correspond to each sense electrode, and the distinct drive signal to each sense electrode may accordingly be modified based on the one or more portions of the combined signal that correspond to the respective sense electrode.

In some embodiments, there may be separate calibration circuits for the proof mass electrodes and the anchored electrodes. For example, the initial tilt from strain on the fixed portion 206 may be separately measured, and a voltage buffer coupled to the proof mass may be used to then determine the average response of the proof mass to an applied test drive signal (e.g., which indicates the average distance of the sense electrodes to the MEMS layer). The proof mass electrodes may be calibrated according to an estimation of the difference in distance compared to the average distance from the fixed electrodes to the fixed portion 206, and changes in the difference in distance after the initial calibration may indicate to MEMS sensor 200 that acceleration is occurring. The proof mass electrodes may then not need to be constantly measured and monitored.

Figure 4:
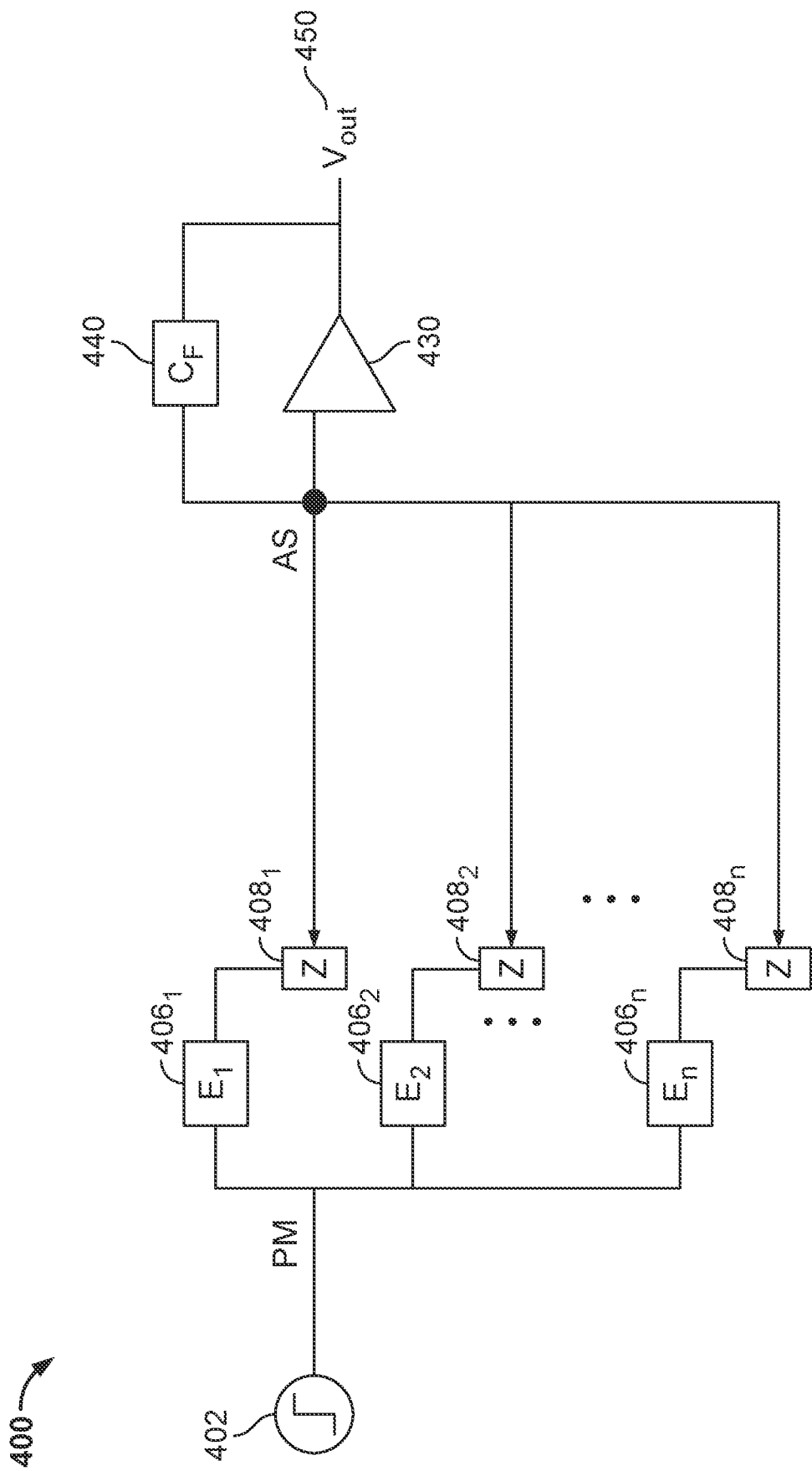
FIG. 4 shows an illustrative circuit diagram that processes outputs of individual sense electrodes of multiple sense electrodes, in accordance with an embodiment of the present disclosure.

FIG. 4 shows an illustrative circuit diagram that processes outputs of individual sense electrodes of multiple sense electrodes, in accordance with an embodiment of the present disclosure. In the embodiment of FIG. 4, signal processing is performed by processing circuitry within the signal path between each individual sense electrode $406_1$, $406_2$, . . . , $406_n$ and the input node AS of the sense circuitry (e.g., C2V 430 and C2V feedback 440). In a similar manner as described with respect to the signal modification circuitry of FIG. 3, signal modification circuitry $408_1$, $408_2$, . . . , $408_n$ is associated with each sense electrode $406_1$-$406_n$, such that each individual signal passed from a respective sense electrode $406_1$-$406_n$ to the sense circuitry can be modified in order to perform calibration testing and set calibration values, as described herein, the primary difference being that the modification of the signal is performed within the sense path (e.g., adjusting each capacitive output) rather than in the drive path (e.g., adjusting the voltage of the signal provided to form each capacitive output). Although particular elements and configurations are depicted in certain configurations for FIG. 4, elements and configurations may be removed, modified, or substituted and additional elements and configuration may be added in certain embodiments, for example, in a similar manner to those described for FIG. 3.

The drive input 402 may be, for example, a base or common drive signal as described for drive input 302 of FIG. 3. It will be understood that similar to FIG. 3, the first subset of the plurality of sense electrodes (e.g., corresponding to the proof mass electrodes 212a-212h in FIG. 2, for example) may be driven and/or processed separately from the second subset of the plurality of sense electrodes (e.g., corresponding to the paddle sense electrodes 208a-208f in FIG. 2), in a variety of manners as described herein.

The received signals corresponding to each of the sense electrodes $406_1$-$406_n$ are individually modified by signal modification circuitry $408_1$-$408_n$, which may for example be individual AC coupled dividers. Another example of signal modification circuitry may include multiplexing circuitry, that selectively provides the sensed signals from the sense electrodes $406_1$-$406_n$ to the sense circuitry (C2V 430 and C2V feedback 440, via sense node AS) during different time periods. In some embodiments, if the signals can be distinguished after the sense circuitry based on the associated sense electrode (e.g., digitally based on the determined calibration values, if the signals are time multiplexed). Further, although not specifically depicted in FIGS. 3 and 4, drive path modification as described in FIG. 3, sense path modification as described in FIG. 4, and digital modification as described herein, may be combined in a single device in any suitable manner, such as to perform rough and fine calibration of sense electrodes or optimize design parameters (power usage, component size, etc.) for particular signal paths (e.g., paddle sense electrodes versus proof mass sense electrodes).

In some embodiments, an AC coupled divider may be used to modify the voltage of the distinct drive signals to each sense electrode $406_1$, $406_2$, . . . , $406_n$. The resulting combined signal is then processed as described herein, such that the combined output is balanced in accordance with the determined or estimated proof mass sense electrode initial conditions.

Figure 5:
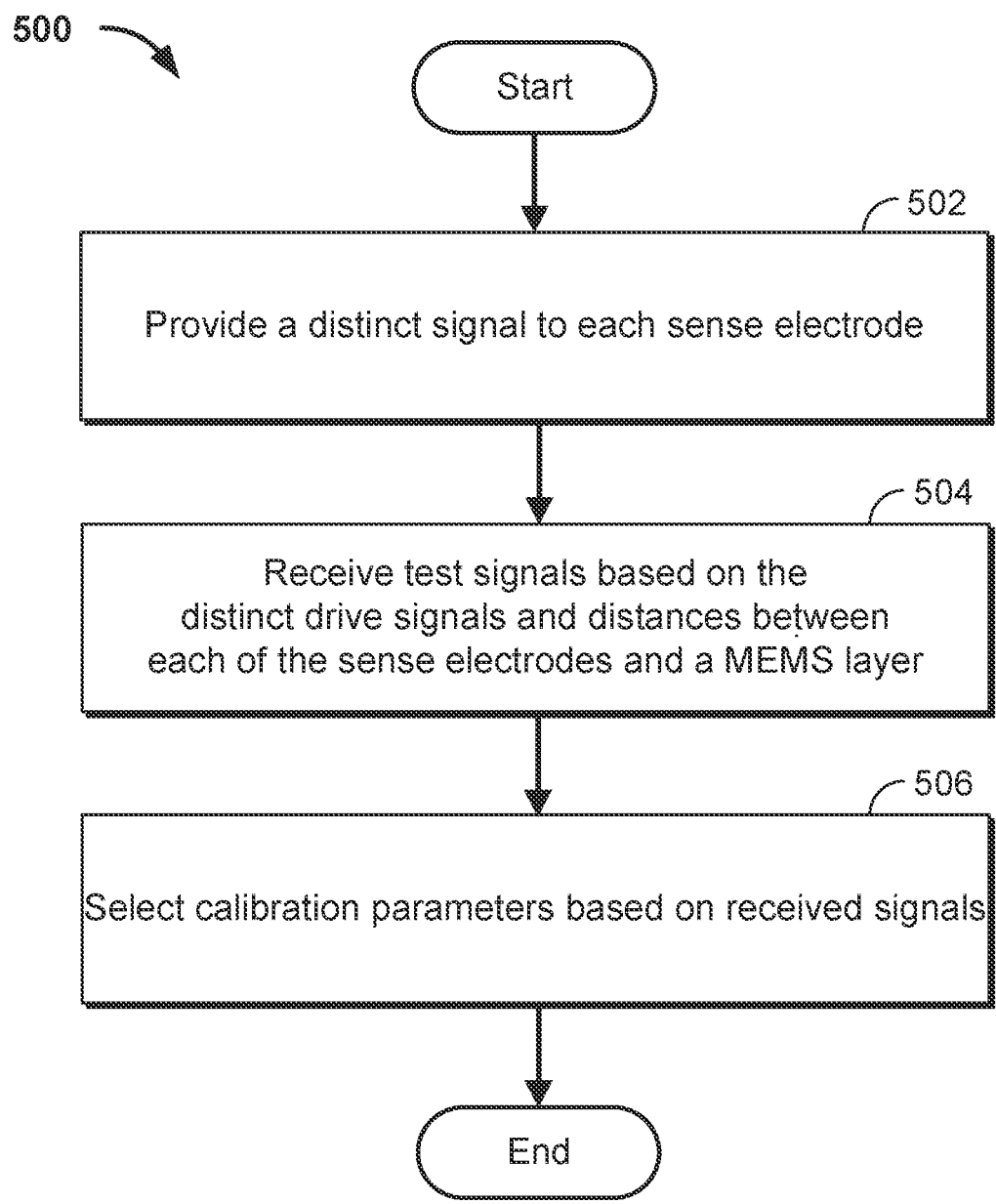
FIG. 5 shows an illustrative flowchart for calibrating operating parameters of sense electrodes of a MEMS sensor, in accordance with an embodiment of the present disclosure.

FIG. 5 shows an illustrative flowchart 500 for calibrating operating parameters of sense electrodes of a MEMS sensor, in accordance with an embodiment of the present disclosure. Although particular steps are depicted in certain configurations for FIG. 5, steps may be removed, modified, or substituted and additional steps may be added in certain embodiments.

Processing begins at step 502, where a distinct signal is provided to each of a plurality of sense electrodes on a MEMS accelerometer, for example, via modification circuitry that modifies a drive signal provided to a sense electrode and/or modification circuitry that modifies that output signal from a sense electrode. The distinct drive signals may be provided, for example, by processing circuitry 104 in FIG. 1, and the plurality of sense electrodes may be a combination of paddle sense electrodes 208a-208f and proof mass electrodes 212a-212h. As described herein, the distinct signals may be provided in a manner that allows for the capacitance for each proof mass sense electrode to be directly determined or estimated, for example, by measuring each proof mass sense electrode individually, utilizing time multiplexed signals, or performing estimates based on signals provided to paddle sense electrodes. Processing may then continue to step 504.

At step 504, test signals are received by processing circuitry (e.g., via a C2V) and processed, such that capacitance values for particular proof mass sense electrodes are measured and/or estimated based on the distinct signal provided to each sense electrode and the gap of each capacitor (e.g., for proof mass sense electrodes, while the proof mass is at rest). These received test signals are processed (e.g., in comparison to each other and an overall capacitance associated with all sense electrodes or subsets of sense electrodes) to provide values that can be compared to determine and/or estimate capacitance and/or gap while the MEMS sensor is at rest (e.g., an initial condition associated with each sense electrode). In some embodiments, multiple distinct signals (e.g., having different voltages) may be provided to each sense electrode to better estimate capacitance or gap. Once the received test signals are processed, processing can continue to step 506.

At step 506, the calibration parameters (e.g., voltage divider values, scaling values, etc.) are determined such that distinct signals can be provided to sense electrodes during active sensor operation. If the output voltages of each sense electrode are not the same (i.e., the distances from the respective sense electrodes to the MEMS layer are not the same) during the calibration process when no acceleration is occurring, then the MEMS accelerometer may have an initial tilt from strain that may need to be calibrated. The distinct signals may be modified so that the output from each of the sense electrodes is the same in response to the same acceleration. For example, in response to detecting a larger distance between a sense electrode and the MEMS layer (i.e., a lower capacitance) compared to the distance between the MEMS layer and other sense electrodes, the voltage of the drive signals provided to the sense electrodes may be balanced such that the capacitive response is the same. In some embodiments, the MEMS accelerometer may include a voltage buffer coupled to the proof mass, where the voltage buffer determines an average response of the proof mass electrodes to the applied test drive signal. Based on the difference between a response from a sense electrode with respect to the average response, the distinct drive voltage to said sense electrode may be accordingly modified.

Figure 6:
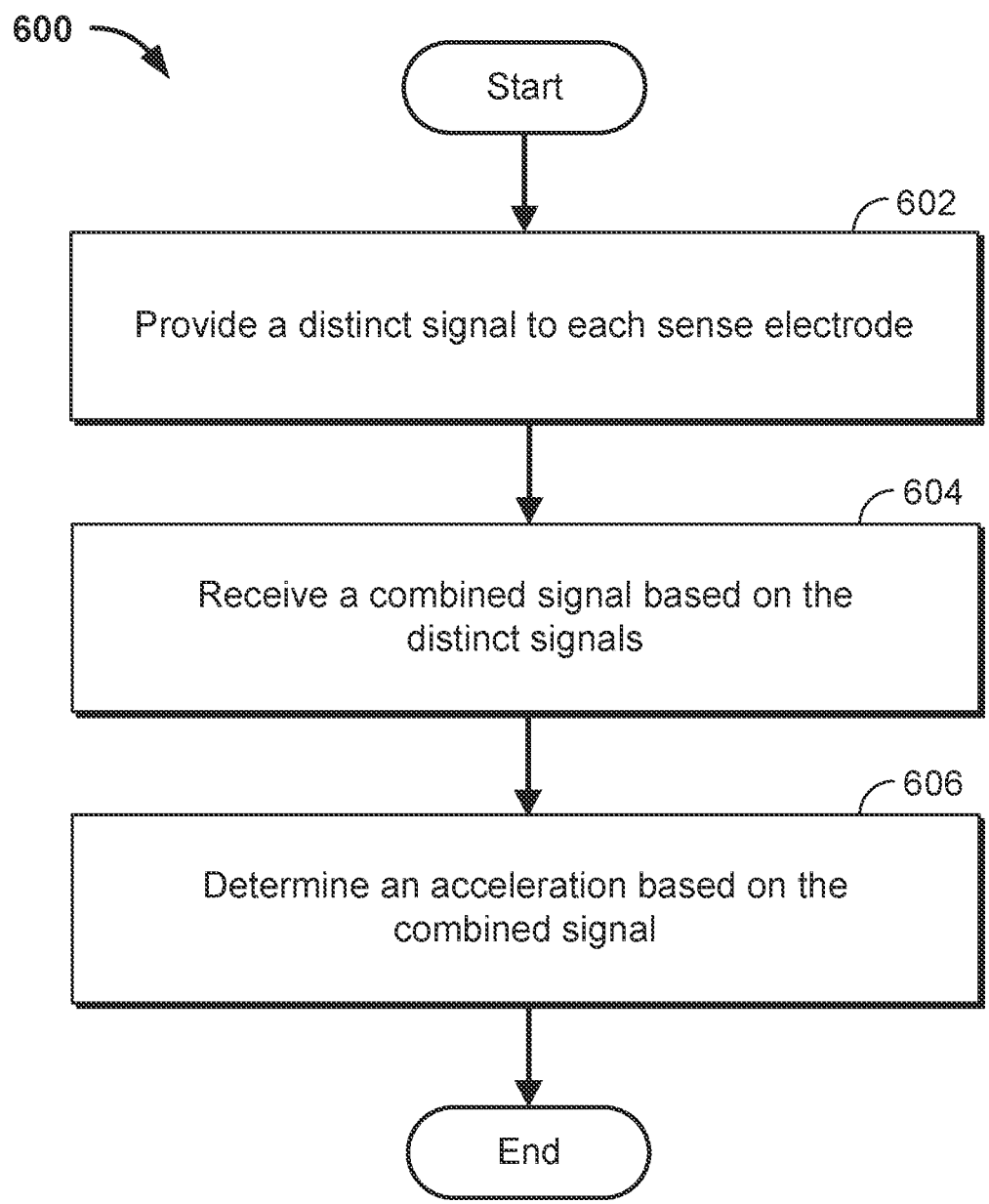
FIG. 6 shows an illustrative flowchart for providing distinct signals to different sense electrodes of a MEMS sensor, in accordance with an embodiment of the present disclosure.

FIG. 6 shows an illustrative flowchart 600 for providing signals to a MEMS accelerometer, in accordance with an embodiment of the present disclosure. Although particular steps are depicted in certain configurations for FIG. 6, steps may be removed, modified, or substituted and additional steps may be added in certain embodiments.

Processing begins at step 602, where a distinct signal is provided for each of a plurality of sense electrodes (e.g., of a MEMS accelerometer), such as providing distinct drive signals to each sense electrode or modifying output signals from each sense electrode. Distinct drive signals may be provided, for example, by processing circuitry 104 in FIG. 1, and the plurality of sense electrodes may be a combination of paddle sense electrodes 208a-208f and proof mass electrodes 212a-212h. The distinct drive signals may be generated by one or more voltage sources and may be modified by circuitry such as individually modifiable voltage dividers, where the voltage divider parameters (e.g., the modification of the peak-to-peak voltage of the drive signal provide to each sense electrode) is based on previously determined calibration values (e.g., corresponding to distances between the respective sense electrodes and the MEMS layer). Processing may then continue to step 604.

At step 604, a combined signal is received based on the distinct drive signals applied to the plurality of sense electrodes, the respective initial gaps of each sense electrodes, and any movement of the proof mass with respect to proof mass sense electrodes. In embodiments where the signal modification occurs in the sense path, the distinct signals may be modified after the sense electrodes in individual sense paths (e.g., by an AC coupled divider). The output signals from each sense electrode are combined via the capacitive sense circuitry voltage adder (such as capacitive voltage adder 340 in FIG. 3) to create the combined signal, and the combined signal may be received by the processing circuitry 104. Processing may then continue to step 606.

At step 606, an acceleration is determined based on the combined signal. As described herein, the distinct signals modified within the drive and/or sense path associated with each sense electrode allow for the proof mass sense electrodes to be balanced, even in the presence of initial conditions (e.g., due to packaging strain, tilt, etc.) in which the sense electrodes would otherwise be unbalanced. Based on the calibration as described herein, the acceleration may be determined accurately directly from the combined signal. In example embodiments where the distinct signals are modulated in some manner, some or all of the calibration processing and signal combination may be performed digitally.

Figure 7:
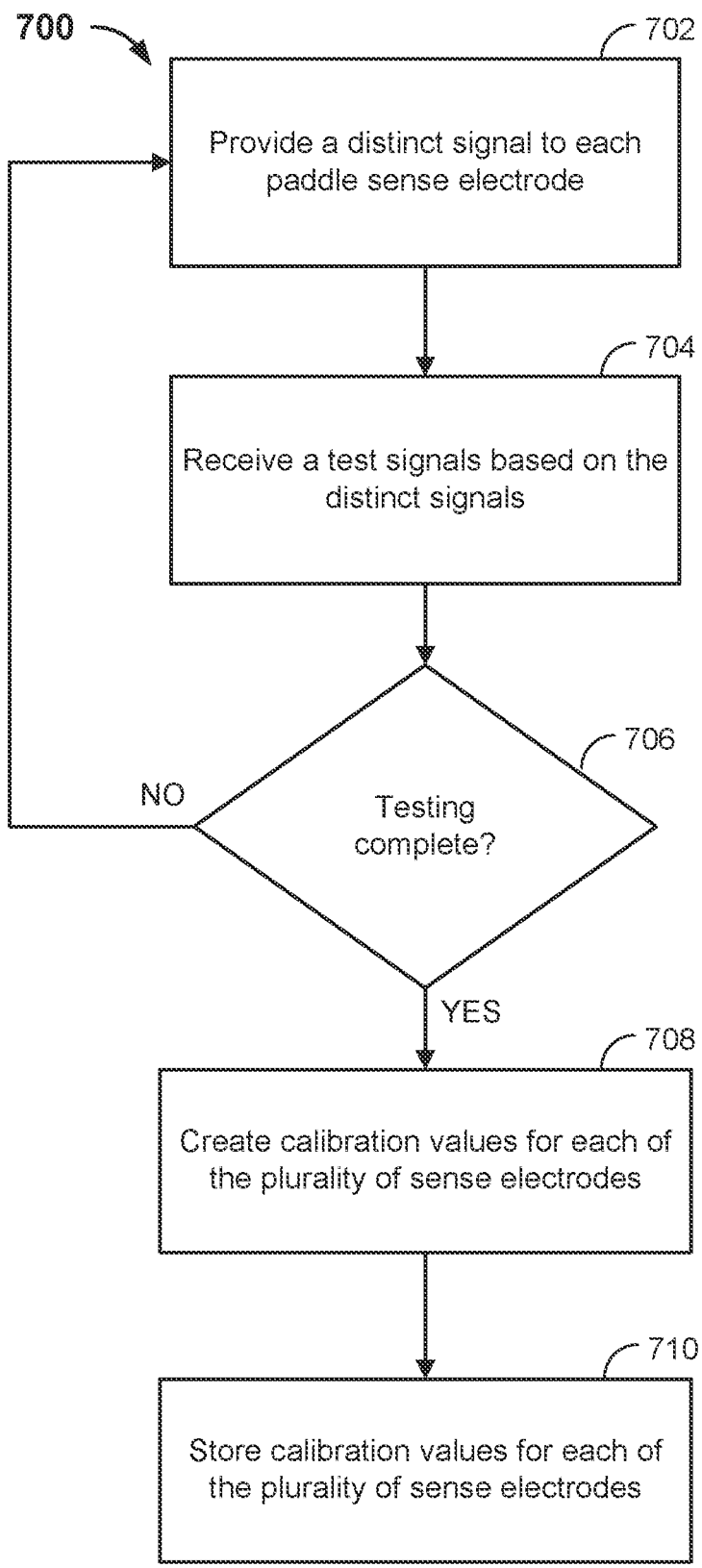
FIG. 7 shows an illustrative flowchart for a modification process of drive signals of a MEMS sensor, in accordance with some embodiments of the present disclosure.

FIG. 7 shows an illustrative flowchart 700 for a modification process of drive signals of a MEMS sensor during system operation, in accordance with some embodiments of the present disclosure. Although particular steps are depicted in certain configurations for FIG. 7, steps may be removed, modified, or substituted and additional steps may be added in certain embodiments.

Processing begins at step 702, where a distinct drive signal is provided to each of a plurality of paddle sense electrodes of a MEMS sensor such as a MEMS accelerometer. The distinct drive signals may be provided, for example, by processing circuitry 104 in FIG. 1, and the plurality of sense electrodes may be paddle sense electrodes 208a-208f. In some embodiments, the distinct drive signals may be generated by one or more voltage sources, and may be modified by circuitry within a drive or sense path as described herein, for example, such that only one or a subset of the paddle sense electrodes are providing a capacitive input at certain times during testing. Processing may then continue to step 704.

At step 704, a test signal is received based on the distinct signals applied to the plurality of paddle sense electrodes, and a respective distance between each of the paddle sense electrodes and a fixed portion of the MEMS layer located above the sense electrode is determined. This process of step 702 and 704 may be repeated until it is determined at step 706 that test signal outputs for all of the paddle sense electrodes have been received. Processing may continue to step 708 once all test signal outputs have been received.

At step 708, calibration values are created for each of a plurality of proof mass sense electrodes. In an embodiment, initial calibration values may have been set for the proof mass sense electrodes, such as in a factory test or a test under conditions where it is known there is no acceleration. Those values may be modified, or set in the first instance, based on estimates determined from the paddle sense electrode test results. For example, paddle sense electrode testing may indicate a change in position of a fixed portion of the MEMS layer relative to a paddle sense electrode, which can be used to adjust calibration values for an adjacent proof mass sense electrode. Once new calibration values are determined or estimated, processing may continue to step 710.

At step 710, the calibration values for each of the plurality of sense electrodes are stored and utilized for measuring the force of interest, such as linear acceleration. The operation of processing circuitry such as voltage dividers, variable resistors, AC coupled dividers, digital scaling values, modulation parameters, input signal, and the like may be adjusted in accordance with the modified calibration values.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A MEMS device, comprising:
   a MEMS layer comprising a fixed portion and a movable portion, wherein the movable portion includes at least one proof mass;
   a plurality of sense electrodes, wherein each respective sense electrode of the plurality of sense electrodes is located below a respective portion of the MEMS layer at a respective distance from the respective portion of the MEMS layer; and
   processing circuitry coupled to the MEMS layer and to each of the plurality of sense electrodes, wherein the processing circuitry is configured to provide a distinct drive signal to each electrode of the plurality of sense electrodes, and wherein each distinct drive signal is based on the respective distance associated with the respective sense electrode.

2. The MEMS device of claim 1, wherein each distinct drive signal is also based on a respective area of each respective sense electrode.

3. The MEMS device of claim 1, wherein each sense electrode of the plurality of sense electrodes is located below the at least one proof mass.

4. The MEMS device of claim 1, wherein a first subset of the plurality of sense electrodes is located below the fixed portion, and wherein a second subset of the plurality of sense electrodes is located below the at least one proof mass.

5. The MEMS device of claim 4, wherein the processing circuitry is further configured to determine the respective distance of each respective electrode of the first subset of sense electrodes based on a drive signal previously applied to each respective electrode of the first subset of sense electrodes.

6. The MEMS device of claim 5, wherein the processing circuitry is further configured to estimate respective distances for the second subset of sense electrodes based on the respective distances determined for the first subset of sense electrodes.

7. The MEMS device of claim 6, wherein the at least some of the first subset of sense electrodes are interdigitated with the second subset of sense electrodes.

8. The MEMS device of claim 6, wherein the distinct drive signal for each sense electrode of the second subset of sense electrodes is based on the respective estimated distance for each sense electrode.

9. The MEMS device of claim 1, wherein the processing circuitry is further configured to apply a test drive signal to each of the plurality of sense electrodes and determine an average response of the proof mass to the applied test drive signal.

10. The MEMS device of claim 9, wherein the average response is determined by a voltage buffer coupled to the proof mass.

11. The MEMS device of claim 9, wherein the processing circuitry is further configured to apply additional test drive signals to pairs of the plurality of sense electrodes and determine the respective distances based on the average response and based on measurements in response to the additional test drive signals.

12. The MEMS device of claim 11, wherein the processing circuitry is configured to apply the additional test drive signals to each pair of the plurality of sense electrodes until all pairs have been tested, and to determine respective distances based on the average response and based on the measurements in response to the additional test drive signals.

13. The MEMS device of claim 1, wherein the processing circuitry applies the distinct drive signals based on at least a voltage divider, a capacitor divider, a time multiplexer, a dual charge pump, or an AC coupled divider.

14. The MEMS device of claim 1, wherein the MEMS device comprises an accelerometer.

15. The MEMS device of claim 1, wherein the MEMS device comprises a barometer, a microphone, or a gyroscope.

16. The MEMS device of claim 1, wherein the MEMS layer rotates about an axis of rotation out of plane relative to the plurality of sense electrodes in response to a linear acceleration along an axis perpendicular to the sense electrodes.

17. The MEMS device of claim 16, wherein a first subset of the plurality of sense electrodes is located below the proof mass on a first side of the axis of rotation, and wherein a second subset of the plurality of sense electrodes is located below the proof mass on a second side of the axis of rotation.

18. The MEMS device of claim 17, wherein a third subset of the plurality of sense electrodes is located below the fixed portion.

19. A method for calibrating drive voltages of a MEMS device, comprising:
   providing, to each of a plurality of sense electrodes located below a MEMS layer, a distinct drive test signal;
   receiving, from at least a portion of the MEMS layer, a combined signal based on the distinct drive test signals applied to the plurality of sense electrodes and a respective distance between each of the sense electrodes and a portion of the MEMS layer located above the sense electrode; and modifying, for a first sense electrode, a drive signal for the first sense electrode based on one or more portions of the combined signal corresponding to the first sense electrode.

20. The method of claim 19, wherein the first sense electrode comprises one of the plurality of sense electrodes and wherein the one or more portions of the combined signal comprise at least a portion of the combined signal corresponding to the distinct drive test signal associated with the first sense electrode.

21. The method of claim 19, wherein the first sense electrode is located between a portion of the MEMS layer located below a proof mass, and wherein the one or more portions of the combined signal comprise a plurality of portions each associated with a sense electrode of the plurality of sense electrodes that is located below a fixed portion of the MEMS layer and adjacent to the first sense electrode.

22. A method for providing drive signals to a MEMS device, comprising:
   providing, to each of a plurality of sense electrodes located below a MEMS layer, a distinct drive signal, wherein each drive signal is based on a distance between each sense electrode and the MEMS layer;
   receiving, from at least a portion of the MEMS layer, a combined signal based on the distinct drive signals applied to the plurality of sense electrodes; and
   determining an acceleration based on the combined signal.

23. A method for providing drive signals to a MEMS accelerometer, comprising:
   providing a common drive signal to a plurality of gain adjustors;
   adjusting, by one or more of the plurality of gain adjustors, the common drive signal to output a plurality of adjusted drive signals;
   receiving, by each of a plurality of sense electrodes connected to a respective one of the plurality of gain adjustors, one of adjusted drive signals, wherein the adjustment of each gain adjustor is based on a distance between each sense electrode of the plurality of sense electrodes and a MEMS layer located above the plurality of sense electrodes;
   receiving, from the MEMS layer, a combined signal based on the plurality of adjusted drive signals applied to the plurality of sense electrodes; and
   determining an acceleration based on the combined signal.

* * * * *